United States Patent
Arends et al.

(10) Patent No.: US 12,510,264 B2
(45) Date of Patent: Dec. 30, 2025

(54) HEAT RECOVERY UNIT

(71) Applicant: ZEHNDER GROUP INTERNATIONAL AG, Gränichen (CH)

(72) Inventors: Eric Arends, Zwolle (NL); Martijn Haddeman, Epe (NL)

(73) Assignee: ZEHNDER GROUP INTERNATIONAL AG, Gränichen (CH)

( * ) Notice: Subject to any disclaimer, the term of this patent is extended or adjusted under 35 U.S.C. 154(b) by 406 days.

(21) Appl. No.: 18/016,116

(22) PCT Filed: Jul. 19, 2021

(86) PCT No.: PCT/EP2021/070135
§ 371 (c)(1),
(2) Date: Jan. 13, 2023

(87) PCT Pub. No.: WO2022/018021
PCT Pub. Date: Jan. 27, 2022

(65) Prior Publication Data
US 2023/0272939 A1    Aug. 31, 2023

(30) Foreign Application Priority Data

Jul. 24, 2020  (CH) .................... 00920/20
Jul. 24, 2020  (CH) .................... 00921/20
(Continued)

(51) Int. Cl.
F24F 12/00    (2006.01)
F24F 13/08    (2006.01)

(52) U.S. Cl.
CPC ............ *F24F 12/006* (2013.01); *F24F 13/08* (2013.01); *F24F 2012/007* (2013.01)

(58) Field of Classification Search
CPC ..... F24F 12/006; F24F 13/08; F24F 2012/007
(Continued)

(56) References Cited

U.S. PATENT DOCUMENTS

| 9,285,136 | B1 | 3/2016 | Perez |
| 2014/0273799 | A1 | 9/2014 | Erb et al. |
| 2019/0145655 | A1 | 5/2019 | Conrad |

FOREIGN PATENT DOCUMENTS

| CA | 3 042 438 A1 | 3/2020 |
| CN | 110388692 A | 10/2019 |

(Continued)

OTHER PUBLICATIONS

EPO (Riswijk, NL), English language version of the International Search Report, Form PCT/ISA/210, for International Application PCT/EP2021/070135, Oct. 28, 2021 (4 pages).

(Continued)

*Primary Examiner* — Edelmira Bosques
*Assistant Examiner* — Dana K Tighe
(74) *Attorney, Agent, or Firm* — Pauley Erickson & Swanson

(57) ABSTRACT

A heat recovery unit with a unit housing (11) defining a unit compartment, a heat exchanger (20), a fresh air bypass flow passage and/or an exhaust air bypass flow passage, a fresh air centrifugal fan arrangement (41) and an exhaust air centrifugal fan arrangement (42), a fresh air filter (51) and an exhaust air filter (52).

17 Claims, 6 Drawing Sheets

(30) Foreign Application Priority Data

Jul. 24, 2020 (CH) ..................................... 00922/20
Mar. 12, 2021 (CH) ..................................... 00270/21

(58) Field of Classification Search
USPC ........................................................ 454/254
See application file for complete search history.

(56) References Cited

FOREIGN PATENT DOCUMENTS

| | | |
|---|---|---|
| CN | 211011801 U | 7/2020 |
| CN | 111609510 A * | 9/2020 |
| DE | 202 14 833 U1 | 11/2003 |
| DE | 10 2008 038 938 A1 | 3/2010 |
| EP | 2 113 726 A1 | 11/2009 |
| EP | 2 778 553 A1 | 9/2014 |
| EP | 2 926 057 | 10/2015 |
| EP | 3 258 181 A1 | 12/2017 |
| EP | 3 453 981 A1 | 3/2019 |
| GB | 2 430 468 A | 3/2007 |
| KR | 10-1841954 B1 | 3/2018 |
| KR | 10-2019-0050211 A | 5/2019 |
| WO | WO 2009/090395 A2 | 7/2009 |
| WO | WO 2011/132994 A2 | 10/2011 |

OTHER PUBLICATIONS

EPO (Riswijk, NL), Written Opinion of the International Searching Authority, Form PCT/ISA/237, for International Application PCT/EP2021/070135, Oct. 28, 2021 (10 pages).

* cited by examiner

HEAT RECOVERY UNIT

CROSS REFERENCE TO RELATED APPLICATION

This application is a National Phase filing in the United States, under 35 USC § 371, of PCT International Patent Application PCT/EP2021/070135, filed on 19 Jul. 2021 which claims the priority of Swiss Patent Applications CH 00920/20, CH 00921/20, and CH 00922/20, filed on 24 Jul. 2020 and Swiss Patent Application CH 00270/21, filed on 12 Mar. 2021.

These applications are hereby incorporated by reference herein in their entirety and is made a part hereof, including but not limited to those portions which specifically appear hereinafter.

BACKGROUND OF THE INVENTION

Field of the Invention

The present invention relates to a heat recovery unit for providing fresh air to a building, which allows for exchanging thermal energy between fresh air entering the building and exhaust air exiting the building.

Discussion of Related Art

Heat recovery units are known in the field of ventilation systems for buildings. Such units comprise a heat exchanger which allows for exchanged thermal energy between fresh air and exhaust air. The advantage of these units is that in winter, thermal energy can be transferred from exhaust air, i.e., air coming from inside the building, to incoming fresh air, i.e., air coming from outside the building, thereby decreasing the overall energy consumption of the building. However, during summer nights, it is desired to deliver cold fresh air into the building without exchanging thermal energy with the exhaust air. Therefore, heat recovery units with a bypass have been developed. Such a bypass allows to deliver fresh air from the outside into the building without thermal energy exchange with the exhaust air. The bypass may either guide the fresh air directly from the outside into a room by bypassing the heat exchanger or alternatively, but less preferred may guide the exhaust air directly from a room to the outside of the building bypassing the heat exchanger.

SUMMARY OF THE INVENTION

A problem associated with the presence of such bypass arrangements is that the heat recovery unit as such becomes more space demanding, which is problematic for installing it within a building.

Furthermore, many heat recovery units known in the prior art rely on using fans for providing the desired air flow. Such fans typically generate significant noise emissions, which reduce the acceptance of the units by the inhabitants.

A further problem of common heat recovery units is their cumbersome installation. Typically, such units require at least four different openings, one inlet and one outlet for both the fresh air and the exhaust air. Generally, for each heat recovery unit a left version and a right version exist. This is because heat recovery units require multiple different components for ensuring proper functionality. However, as the units are typically designed such that their space demand in a building is as small as possible, left and right versions are provided. Before installation, depending on the building configuration, either the left version or the right version is ordered and delivered. This is problematic, because if the wrong version is ordered, it is not possible to simply turn the unit, as all components, such as fans, heat exchanger, filters, and the like have to be rearranged.

It is the general object of the present invention to advance the state of the art regarding heat recovery units and preferably fully or at least partially overcome the problems of the prior art mentioned above. In favorable embodiments, a particularly compact heat recovery unit is provided. In further favorable embodiments, a heat recovery unit is provided with reduced noise emissions, particularly while maintaining a high air volume throughput. In further favorable embodiments, a heat recovery unit is provided, which can be used as both a left and a right version, without having to reassemble all or at least most of the components within the heat recovery unit.

The general object is achieved by a heat recovery unit comprising:

A unit housing defining a unit compartment. The unit housing comprises a supply air outlet for providing air flow from the unit compartment to the inside of a building, a return air inlet for providing return air flow from the inside of a building to the unit compartment, an exhaust air outlet for providing exhaust air flow from the unit compartment to the outside atmosphere of a building and an outside air inlet for providing air flow from the outside environment of a building to the unit compartment. The heat recovery unit further comprises a fresh air flow path from the outside air inlet to the supply air outlet and an exhaust air flow path from the return air inlet to the exhaust air outlet. Typically, the fresh air flow path and the exhaust air flow path may be fluidic separated, i.e., isolated, from each other.

A heat exchanger being arranged within the unit compartment, the heat exchanger comprising fresh air flow passages for a fresh air flow, wherein the fresh air flow passages are in fluid communication with the supply air outlet and the outside air inlet. The heat exchanger further comprises exhaust air flow passages for an exhaust air flow, wherein the exhaust air flow passages are in fluidic communication with the return air inlet and the exhaust air outlet. The fresh air flow passages and the exhaust air flow passages are configured such that thermal energy can be exchanged between the fresh air flow and the exhaust air flow.

A fresh air bypass flow passage being in fluidic communication with the supply air outlet and with the outside air inlet, preferably being only in fluidic communication with the supply air outlet and with the outside air inlet. The fresh air bypass flow passage bypasses the heat exchanger. Additionally, or alternatively, the heat recovery unit comprises an exhaust air bypass flow passage being in fluidic communication with the return air inlet and with the exhaust air outlet, preferably being only in fluidic communication with the return air inlet and with the exhaust air outlet. The exhaust air bypass flow passage bypasses the heat exchanger. The fresh air bypass flow passage and/or the exhaust air bypass flow passage comprises a bypass valve arranged within the fresh air bypass flow passage and/or within the exhaust air bypass flow passage, wherein the bypass valve is configured to control air flow through the fresh air bypass flow passage and/or the exhaust air bypass flow passage.

A fresh air centrifugal fan arrangement configured for transporting fresh air from the outside air inlet to the supply air outlet, and an exhaust air centrifugal fan arrangement configured for transporting exhaust air from return air inlet to the exhaust air outlet.

A fresh air filter being arranged within the fresh air flow path and an exhaust air filter being arranged within the exhaust air flow path.

Typically, not only the heat exchanger, but also the fresh air bypass flow passage, the exhaust air flow passage, the fresh air centrifugal fan arrangement, the exhaust air centrifugal fan arrangement, the fresh air filter and/or the exhaust air filter are arranged within the unit compartment defined by the unit housing.

The unit compartment may have a length extending along the longitudinal direction of the unit housing, a width extending along the lateral direction of the unit housing, being perpendicular to the longitudinal direction of the unit housing and a depth extending along the vertical direction of the unit housing, being perpendicular to both the longitudinal direction and the lateral direction of the unit housing. The length may for example be larger than the width and/or the depth of the unit compartment. Furthermore, in the operative state, i.e., in the installed state, the heat recovery ventilation unit may be installed such that the length and the width may extend horizontally, i.e., parallel to the floor or the ceiling of the building, whereas the depth may extend vertically, i.e., perpendicular to the floor or the ceiling of the building.

In some embodiments, the length of the unit compartment may be in the range of 500 mm to 1700 mm, particularly between 700 mm to 1200 mm.

In some embodiments, the width of the unit compartment may be in the range of 500 mm to 1700 mm, particularly between 700 mm to 1200 mm.

In some embodiments, the depth of the unit compartment may be in the range of 200 mm to 500 mm, particularly between 250 mm to 400 mm.

In some embodiments, the heat recovery unit has a volume of 50 m3/h to 800 m3/h, preferably between 150 m3/h to 600 m3/h.

In some embodiments, the unit housing comprises different mounting structures being arranged on different levels with respect to a specific spatial dimension, in particular with respect to the vertical direction of the heat recovery unit. Mounting structures on a given level may typically be arranged within a plane. The mounting structures may for example be holes, in particular threaded holes, being configured to receive a correspondingly fitting, such as a screw, latch, hook or the like. In particular embodiments, the heat recovery unit may comprise mounting brackets being mechanically coupled to the mounting structures. The mounting brackets are typically configured such that they allow for mounting the heat recovery unit to a wall or a ceiling.

In some embodiments, the outside air inlet and the return air inlet are arranged on opposite ends of the unit housing, preferably at opposite ends along the longitudinal direction. In some embodiments, the exhaust air outlet and the supply air outlet are arranged on opposite ends of the unit housing, preferably at opposite ends along the longitudinal direction.

In some embodiments, the outside air inlet, the return air inlet, the exhaust air outlet and/or the supply air outlet are bended tubes, which may in particular be protruding. Preferably, the bended tubes are turnable or rotatable, which simplifies the installation of the heat recovery unit.

In some embodiments, the bypass valve is switchable between a closed position and an open position. In the closed position, air flow through the fresh air bypass flow passage, respectively the exhaust air bypass flow passage, is prevented, while air flow from the outside air inlet to the supply air outlet via the fresh air flow passages of the heat exchanger, respectively from the return air inlet to the exhaust air outlet via the exhaust air flow passages of the heat exchanger is enabled. In contrast, in the open position, air flow through the fresh air bypass flow passage, respectively the exhaust air bypass flow passage, is enabled, while air flow from the outside air inlet to the supply air outlet via the fresh air flow passages of the heat exchanger, respectively from the return air inlet to the exhaust air outlet via the exhaust air flow passages of the heat exchanger is preferably prevented.

In some embodiments, the bypass valve comprises a plurality of elongated members extending across the fresh air bypass flow passage and/or the exhaust air bypass flow passage. The elongated members are arranged in parallel adjacent to each other, thereby forming in a closed position a barrier configured to provide maximum or infinite flow resistance to air flowing through the fresh air bypass flow passage and/or the exhaust air bypass flow passage. Preferably, the elongated members completely prevent air from flowing through the fresh air bypass flow passage and/or the exhaust air bypass flow passage, particularly by providing a tight sealing connection between each other in the closed position. Furthermore, at least some of the elongated members, particularly all of the elongated members are switchable into an open position in which the elongated members provide a minimum flow resistance through air flowing through the fresh air bypass flow passage and/or the exhaust air bypass flow passage. It is understood that in in the closed position, air flow through the fresh air bypass flow passage, respectively the exhaust air bypass flow passage, is prevented, while air flow from the outside air inlet to the supply air outlet via the fresh air flow passages of the heat exchanger, respectively from the return air inlet to the exhaust air outlet via the exhaust air flow passages of the heat exchanger is enabled. The advantage of such a bypass valve comprising a plurality of elongated members as defined above is that the space requirement for the valve is reduced, because individually rotatable elongated members require less space for freely rotating around their axis than a single large element.

In some embodiments, the bypass valve comprises 2 to 10, preferably 3 to 6 elongated members.

In some embodiments, the elongated members are rotatable clockwise and/or counterclockwise around their axis of rotation to switch between an open position and the closed position. In some embodiments, a first group of elongated members is rotatable only clockwise, while a second group is rotatable only counterclockwise, or vice versa.

In some embodiments, the elongated members may be lamellae or slots or louvers.

In some embodiments, a radial dimension of an elongated member from its axis of rotation to its surface varies as a function of angular direction, i.e., the azimuth angle, within a plane orthogonal to said axis of rotation, thus defining angular directions with maximum radial dimension and angular directions with minimal radial dimensions. As a result, the closed position of an elongated member is provided by having its maximum radial dimension extend in a direction orthogonal the overall flow direction, thus causing maximum to infinite flow resistance, while in the open position, the respective elongated member is provided by having its minimal radial dimension extend in a direction orthogonal the overall flow direction, thus causing minimum flow resistance.

A radial dimension of an elongated member from its axis of rotation to its surface may vary as a function of axial location along said axis of rotation. For instance, angular directions with maximum radial dimension and angular directions with minimum radial dimension may alternate along the axial extension of an elongated member.

In some embodiments, at least a portion of each of the elongated members or each elongated member as such is made of an elastomer material. This improves the sealing function between adjacent elongated members engaging each other. In particular, each elongated member may comprise or consist of an elastomer material at its radially outermost locations. This has the advantage that the radially outermost locations of the elongated member will first contact the adjacent elongated member and then elastically deform, thus creating a significantly tighter seal between adjacent elongated members.

The plurality of elongated members arranged in parallel next to each other may alternately comprise elongated members of a first type and elongated members of a second type. The elongated members of the first type may be elongated members rotatable around their longitudinal axis while the elongated members of the second type may be stationary elongated members which are fixedly mounted, i.e., thus not rotatable. The second type stationary elongated members may have a cross-sectional profile making them more rigid against bending in the air flow direction through the bypass valve than the first type stationary elongated members. As a result, the rigidity of the plurality of first type and second type elongated members of the bypass valve in their closed position is increased, thus minimizing any bending of the elongated members when exposed to a pressure difference.

In some embodiments, each elongated member comprises a first angular direction with a first maximum radial dimension and a second angular direction with a second maximum radial dimension, the first angular direction and the second angular direction differing by 180°, i.e., the first maximum radial dimension and the second maximum radial dimension are diametrically opposite to each other with respect to the longitudinal axis of rotation of the respective elongated member. Particularly, all elongated members comprise a first angular direction with a first maximum radial dimension and a second angular direction with a second maximum radial dimension. As a result, when the elongated member or all elongated members are in the closed position, the first and second angular directions with the maximum radial dimensions of the elongated members extend in a direction orthogonal to the air flow direction along the bypass duct, thus contributing to the sealing function.

In some embodiments, each elongated member may have a lentil-shaped cross-section. Such lentil-shaped cross sections provide enough rigidity close to the axis of rotation, thus preventing unwanted bending. In addition, they provide increased sealing between adjacent elongated members in the closed position, especially with some elastomeric material portion at their radially outermost portions. In addition, their air flow resistance and noise generating potential is reduced when they are in the open position.

The elongated members arranged in parallel next to each other and forming an arrangement of a plurality of elongated members next to each other as a one-elongate-member-thick layer may in some embodiments be rotatable supported in a frame. The frame provides the arrangement of elongated members of the bypass valve with sufficient strength.

In some embodiments, each elongated member comprises at its a radially outermost location a first structural formation and on its opposite radially outennost location a second structural formation being complementary to the first structural configuration. The first and second structural formation are configured such that they engage with corresponding first and/or second structural formations of a directly adjacent elongated member, thereby preferably forming a particularly air tight seal in the closed position.

In some embodiments, the heat recovery unit, particularly the bypass valve, further comprises a drive motor configured to switch the elongated members between the open position and the closed position.

In some embodiments, the drive motor may be under control of a control unit. The control unit may particularly be connected to a temperature sensor being configured to measure the building inside temperature and the outside temperature. If the temperature difference between the building inside temperature and the outside temperature reaches a predefined threshold at a given time of the day, the control unit may automatically activate the drive motor to bring the bypass valve in the closed position or in the open position.

The control unit may in some embodiments also be configured such that the heat recovery unit can be switched from a left version to a right version or vice versa, for example by inputting a command into the control unit.

The heat recovery unit may therefore generally comprise a control unit, such as a control circuit, a microprocessor, or the like.

In some embodiments, the air flow cross section of the return air inlet and the air flow cross section of the outside air inlet are greater than the air flow cross section of the supply air outlet and the air flow cross section of the exhaust air outlet. Given the fact that the return air duct portions and the outside air duct portions are typically driven in suction mode with respect to atmospheric pressure, the greater cross sections in these duct portions minimize overall pressure drop. This improves the performance of the unit with respect to air throughput and noise generation.

In some embodiments, the heat recovery unit comprises both a fresh air bypass flow passage and an exhaust air bypass flow passage as described in any of the embodiments above. These are typically symmetrically arranged with respect to each other. The advantage is that (i) both the fresh air and the exhaust air can bypass the heat exchanger, which further reduced noise generation and increases energy efficiency, and (ii) it does not matter during installation which outlet and which inlet is connected to the corresponding preinstalled tubing. In other words, at least the bypass functionality can be freely configured even after installation, which simplifies the overall installation.

In some embodiments the heat exchanger is a cross-counter current heat exchanger. In some embodiments, fresh air flow passages and the exhaust air flow passages are at least partially formed by polymer membranes.

In some embodiments, the fresh air filter is arranged between the heat exchanger and the outside air inlet. In some embodiments, the exhaust air filter is arranged between the heat exchanger and the exhaust air outlet.

In some embodiments the fresh air filter and the exhaust air filter are symmetrically arranged with respect to each other within the unit compartment.

In some embodiments, the fresh air filter is arranged between the heat exchanger and the outside air inlet and wherein the exhaust air filter is arranged between the heat exchanger and the exhaust air outlet. Both the fresh air filter and the exhaust air filter may, depending on the filter employed, prevent dust and/or other particles, such as bacteria, viruses, smoke and the like, from entering the building. By employing both a fresh air filter arranged between the heat exchanger and the outside air inlet and an exhaust air filter between the heat exchanger and the exhaust air outlet, it does not matter during the installation if the outside air inlet is actually connected to a tubing intended for exhaust air or to a tubing intended for fresh air. Thus, installation is simplified, as even if accidentally the heat recovery unit is wrongfully installed with respect to the inlet or outlet, it is ensured that incoming fresh air is filtered, as both flow paths cross a filter.

In some embodiments, the fresh air filter and the exhaust air filter each are arranged within a separate filter assembly comprising a wedge shaped frame. Both the fresh air filter and the exhaust air filter are fixed within the corresponding frame.

The wedge shape frame typically comprises or consists of, a first frame portion having a first height, a second frame portion having a second height which is greater than the first height, and being arranged opposite the first frame portion, a third frame portion and a fourth frame portion being arranged opposite the third frame portion, wherein the third frame portion and the fourth frame portion each extend between the first frame portion and the second frame portion. Typically, a height of the third frame portion and the height of the fourth frame portion may be selected such that it is between the first and second height. It is understood that the height of a frame portion extends in the operative state in the direction of flow, i.e., parallel to the air flow passing the filter and may typically be measured with respect to the framed surface of the filtering element.

As the first frame portion has in general the smallest height and the oppositely arranged second frame portion has in general the largest height, the air filter assembly is wedge shaped. Wedge shaped filters have the advantage that they can be readily pushed into and pulled out of its air filtering operating position in a slot of the heat recovery unit. The wedge shaped air filter assembly easily fits into this recess by inserting it with its first frame portion, i.e. with its smallest frame portion ahead. In addition, due to the second, third and fourth frame portions all being higher than the first frame portion, all four frame portions and primarily the second, third and fourth frame portions constitute a filter frame wall around the framed surface of the filtering element. When pulling a saturated/used air filter assembly out of the recess of the heat recovery unit, the filter frame wall prevents dust accumulated on the framed surface of the filtering element from falling off and onto a person exchanging the filter.

The cross section of each filter frame may comprise at least two frame portions being parallel to each other. For example, the filter frame may have a trapezoid or a rectangular cross section.

In some embodiments, each filter assembly is received by a slot within the unit housing and wherein the filter assembly is releasably mounted to the unit housing. Typically, the slot is configured, respectively arranged, such that the filter assembly can be inserted perpendicularly to the air flow. Such a slot enables to provide a particularly space saving heat recovery unit. The user can simply release the filter, i.e., by removing a filter enclosure, which may for example be attached to the housing by a snap fit or the like, without having to dismantle the whole unit.

In some embodiments, the fresh air filter and the exhaust air filter each has a thickness, which is smaller than the first height of the first frame portion. It is understood that the thickness of the corresponding air filter extends in the operative state in the direction of air flow.

In some embodiments, the fresh air filter and the exhaust air filter may be pleated filters.

In some embodiments, the fresh air centrifugal fan arrangement and the exhaust air centrifugal fan arrangement are arranged on opposite sides of the unit housing.

It is understood that each centrifugal fan arrangement comprises a fan, particularly one fan.

In some embodiments, the fresh air centrifugal fan arrangement and the exhaust air centrifugal fan arrangement are equal, i.e., structurally equal. However, it is understood that they are still separate arrangements.

In some embodiments, the fresh air centrifugal fan arrangement and the exhaust air centrifugal fan arrangement are symmetrically arranged with respect to each other within the unit compartment.

In some embodiments, the fresh air centrifugal fan arrangement and the exhaust air centrifugal fan arrangement each comprise a centrifugal fan mounted within a scroll housing. Scroll housings are advantageous, as these allow for providing higher air pressures.

In some embodiments, each centrifugal fan comprises a plurality of circumferentially spaced fan blades fixed to a central fan axle extending along an axial direction and/or to a circumferential fan ring extending in a plane orthogonal to an axial direction.

The fan blades may for example be straight radial blades. The fan blades may also be curved blades, either forward-curved blades or, preferably, backward-curved blades.

In some embodiments, each scroll housing comprises a housing main portion with a maximum housing diameter $D_{fan}$ and a maximum axial housing width $H_{fan}$, a housing inlet portion defining an inner air inlet space and a housing outlet portion defining an air outlet space. The housing main portion surrounds the centrifugal fan to define a circumferentially extending air guiding space. The housing inlet portion is located at a radially inner location with respect to the air guiding space to define an inner air inlet space for guiding air from the heat exchanger or from the fresh air bypass flow passage, respectively the exhaust air bypass flow passage, into the scroll housing. The housing outlet portion is located at a radially outer location with respect to the air guiding space and defines an air outlet space. The air outlet space may typically be directly connected to the supply air outlet, respectively to the return air inlet.

The axial housing width extends typically perpendicular to the housing diameter.

In some embodiments, the ratio D/H between the maximum housing diameter $D_{fan}$ and the maximum axial housing width $H_{fan}$ is between 20:10 and 35:10, particularly between 25:10 and 32:1, preferably between 25:10 and 30:10. Such housings are particularly advantageous, because the housing is relatively flat and thus allows to provide an overall smaller and less space demanding heat recovery unit. Due to its small D/H ratio, the centrifugal fan arrangement can be fitted in such a flat unit housing with its axial direction or the axis of rotation of the fan in a plane defined by the length and width directions of the housing, i.e., orthogonal to the direction defined by the depth, respectively the vertical direction, of the housing. Typically, such flat heat recovery units having such flat housings, enabled by the centrifugal fan arrangement, are installed at a ceiling or at a wall with the axis of rotation of the centrifugal fan arrangement being parallel to the ceiling surface or to the wall surface.

In some embodiments, the maximum housing diameter Dfan may be between 200 mm to 550 mm, preferably between 250 mm to 400 mm.

In some embodiments, the maximal housing width Hfan is between 50 mm and 250 mm, preferably between 80 mm and 200 mm.

In some embodiments, the fan blades of the centrifugal fan arrangement may have a maximum axial blade width E and a maximum radial blade length F. Preferably, a ratio E/H between said axial blade width E and said maximum axial housing width H is selected form between 2/10 and 8/10, and preferably from between 3/10 and 6/10.

In some embodiments a ratio g/E between a radial gap g between an inner surface of the housing main portion and a radial end of each blade, and the maximum radial blade width E is selected from between 1/10 and 12/10, and preferably between 2/10 and 8/10.

Preferably, a ratio g/F between a radial gap g between an inner surface of the housing main portion and a radial end of each blade, and the maximum radial blade length F is selected from between 1/20 and 10/20, and preferably between 1/20 and 5/20.

These specific ratios, i.e., the E/H, g/E and/or g/F ratio, ensure optimal working conditions for a scroll housing having a maximum diameter of 350 mm, in particular maximum 300 mm. Therefore, an efficient but also saving spacing fan arrangement can be provided.

In some embodiments, the housing outlet portion defines an angled air flow path from the air guiding space towards the air outlet space, wherein preferably the air flow path is angled by an angle of 30° to 60°, particularly 40° to 50°. Such an angle allows for a space saving and flexible installation of the corresponding centrifugal fan arrangement. Additionally, as the airflow must only undergo a turn of an angle of only 30° to 60°, particularly 40° to 50°, significant pressure drops are avoided.

In some embodiments, the housing outlet portion at least partially defines an air flow path from the air guiding space towards the air outlet space being transverse, particularly perpendicular, to the air flow exiting the heat exchanger and/or to the air flow entering the inner air inlet space of the scroll housing. In other words, this air flow path from the air guiding space towards the air outlet space may be perpendicular to the rotation axis of each of the fans. Such embodiments do not exclude an angled air flow path as defined above. In such embodiments, a first part between air flow path from the air guiding space to the angle may be transverse to the air flow exiting the heat exchanger and/or to the air flow entering the inner air inlet space of the scroll housing, as defined above. Such embodiments have the advantage that the space demand for each of the scroll housings is low and thus the overall size of the heat recovery unit can be reduced.

In some embodiments, each scroll housing is arranged such that air flow exiting the heat exchanger enters each scroll housing without being guided along an angled flow path, i.e., the air flow exiting the heat exchanger can enter each scroll housing along a linear flow path. In certain embodiments, the fan of the corresponding centrifugal fan directly faces the heat exchanger. In other words, the centrifugal fan arrangement is arranged such that the rotational axis of each fan directly extends towards the heat exchanger. Such embodiments have the advantage that the air exiting the heat exchanger can directly enter the scroll housing without being angled, which causes noise emissions and pressure drops. The distance between each of the centrifugal fans, i.e., from the center of the air inlet space, and the heat exchanger may in some embodiments be 50 mm to 400 mm, particularly 75 mm to 200 mm, in order to minimize noise emissions.

In some embodiments, the fresh air centrifugal fan arrangement and the exhaust air centrifugal fan arrangement has an air volume of between 200 to 500 m3/h, particularly between 250 to 350 m3/h.

In some embodiments, the specific fan power of the fresh air centrifugal fan arrangement and the exhaust air centrifugal fan arrangement is between 0.1 to 0.4 Wh/m3, preferably between 0.15 to 0.3 Wh/m3.

In some embodiments, the heat recovery unit further comprises a drainage for collecting and removing condensate. The drainage is typically arranged such that it can collect condensate from the heat exchanger. Such a drainage can ensure that condensate is guided and collected at an easily accessible side of the heat recovery unit.

In some embodiments, the drainage comprises a drip tray. Preferably, the drip tray can be removed. Typically, the drainage may comprise at least one, preferably two, drainage ports, and a drainage pipe being fluidic connected to one drainage port, preferably to only one drainage port. The drainage ports are configured such that condensate can be guided from the drip tray through a drainage port to the outside of the heat recovery unit, in particular via a drainage pipe.

The drip tray and/or the heat recovery unit compartment can be configured such that condensate is guided to a specific drainage port.

The drainage, in particular the drip tray, may in some embodiment completely extend from a first wall of the unit housing to an opposing second wall of the unit housing.

In some embodiments, the heat recovery unit, particularly the unit housing, can comprise an inclination towards the drainage, in particular towards the drainage port and/or the drip tray. The inclination is configured such that condensate is directed towards the drainage, in particular towards the drainage port and/or the drip tray.

The drainage may further comprise a drainage pipe being configured to remove collected condensate from the heat recovery unit. The drainage pipe may be in fluidic communication with the drainage port. The drainage pipe may also be in fluidic communication with the outside environment of the heat recovery unit.

In some embodiments the drainage comprises two symmetrically arranged drainage ports. The two drainage ports may particularly be symmetrically arranged with respect to the symmetry plane described herein.

In some embodiments, only one of the drainage ports may be fluidic connected to the drainage pipe. If the heat recovery unit is supposed to be used in another configuration, i.e., if the drainage pipe is configured for a left version of the heat recovery unit and the user wants to use a right version, the drainage pipe may be connected to the corresponding other drainage port. Thus, the drainage tube is in general removable. This has the advantage that the drainage ports themselves need not to be removed or changed, but only the drainage pipe.

In some embodiments, the drainage pipe can be coupled and released to a drainage port by a tubular connecting structure which circumferentially extends around the drainage port and which is slidable along the drainage port. In the connected state, the drainage pipe may circumferentially enclose the tubular connecting structure. For disconnection, the tubular connecting structure can be slid along the drainage port away from the drainage pipe such that the drainage pipe and the tubular connecting structure are not in direct mechanical contact and the drainage pipe can be removed. Preferably, the tubular connecting structure can have the shape of a hollow cylinder. In some embodiments, the tubular connecting structure may be made of rubber.

In some embodiments, the tubular connecting structure comprises an outer circumferentially extending protuberance being configured as a stopper for the drainage pipe.

In some embodiments, the heat recovery unit comprises a setup being symmetric with respect to a symmetry plane, wherein the symmetry plane symmetrically divides the heat recovery unit in a first region and a second region, and wherein the supply air outlet and the return air inlet are arranged in the first region and the exhaust air outlet and the outside air inlet are arranged in the second region. Such embodiments have the advantage that is not necessary to provide two different mirrored version of the heat recovery unit, but the same heat recovery unit can be used independent of the arrangement of the already installed tubing in a building. This simplifies the installation and also decreases production costs.

In some embodiments, the first region comprises the fresh air centrifugal fan arrangement and the second region comprises the exhaust air centrifugal fan arrangement. The fresh air centrifugal fan arrangement and the exhaust air centrifugal fan arrangement are symmetrically arranged with respect to the symmetry plane.

In some embodiments the first region comprises the exhaust air filter and the second region comprises the fresh air filter. The exhaust air filter and the fresh air filter are symmetrically arranged with respect to the symmetry plane.

In some embodiments the fresh air bypass flow passage and the exhaust air bypass flow passage are symmetrically arranged with respect to the symmetry plane.

The symmetry plane extends typically long the lateral direction of the unit housing and along the vertical direction of the unit housing, but not along the longitudinal direction of the unit housing.

In some embodiments, the symmetry plane extends through the heat exchanger, wherein the heat exchanger is symmetrical with respect to the symmetry plane.

It is understood that despite the presence of a symmetry plane described above, there may be components which are not arranged symmetrically with respect to the symmetry plane, and which may not be within the first and second region but may still be arranged within the unit compartment. For example, a control unit and/or the drainage may not be symmetrically arranged with respect to the symmetry plane. This has however no detrimental effect on the installation because the arrangement of such components is not influenced by the arrangement of the already installed tubing in the building. In some embodiments, the heat recovery unit comprises a preheater to pre-heat the air. In these embodiments, the preheater may also be not symmetrical to the symmetry plane. However, such a pre-heater is preferably releasably mounted and can therefore be quickly repositioned if required.

BRIEF DESCRIPTION OF SEVERAL VIEWS OF THE DRAWINGS

The herein described invention will be more fully understood from the detailed description given herein below and the accompanying drawings which should not be considered limiting to the invention described in the appended claims. The drawings are showing:

FIG. 1b shows a schematic side view of the heat recovery unit of FIG. 1a;

FIG. 1f shows a sectional view along D-D of the heat recovery unit of FIG. 1a;

DETAILED DESCRIPTION OF THE INVENTION

Figure 1A:
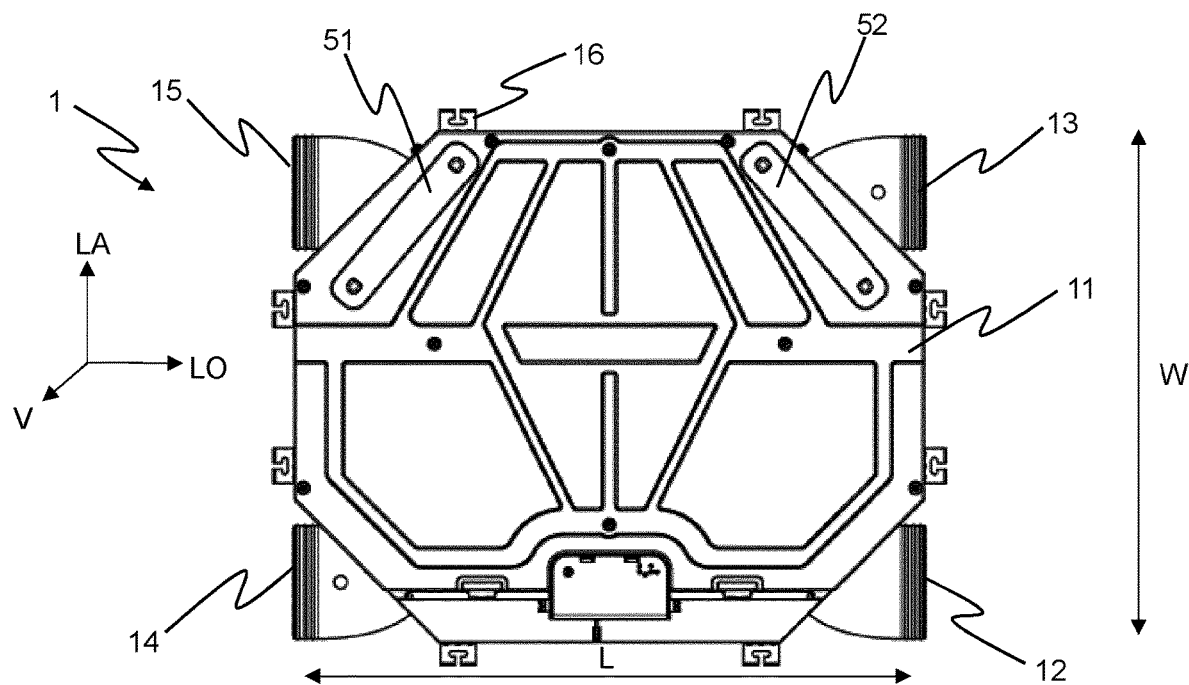
FIG. 1a shows a schematic view on a heat recovery unit according to one embodiment of the invention.

FIG. 1a shows a view onto a heat recovery unit 1 according to an embodiment of the invention. The heat recovery unit comprises a unit housing 11 defining a unit compartment. Unit housing 11 comprises a supply air outlet 12 for providing air flow from the unit compartment to the inside of a building, a return air inlet 13 for providing return air flow from the inside of a building to the unit compartment, an exhaust air outlet 14 for providing exhaust air flow from the unit compartment to the outside atmosphere of a building and an outside air inlet 15 for providing air flow from the outside environment of a building to the unit compartment. The heat recovery unit further comprises eight mounting brackets 16 (for clarity purposes only a single mounting bracket is provided with a reference sign). Heat recovery unit 1 additionally comprises a fresh air flow path from outside air inlet 15 to supply air outlet 12 and an exhaust air flow path from return air inlet 13 to exhaust air outlet 14. The unit compartment may have a length L extending along the longitudinal direction LO of unit housing 11, a width W extending along the lateral direction LA of the unit housing 11, being perpendicular to the longitudinal direction of the unit housing and a depth D (see FIG. 1b) extending along the vertical direction V of unit housing 11, being perpendicular to both longitudinal direction LO and lateral direction LA of the unit housing. It can further be seen that fresh air filter 51 and exhaust air filter 52 each are received within a slot within housing 11.

Figure 1B:
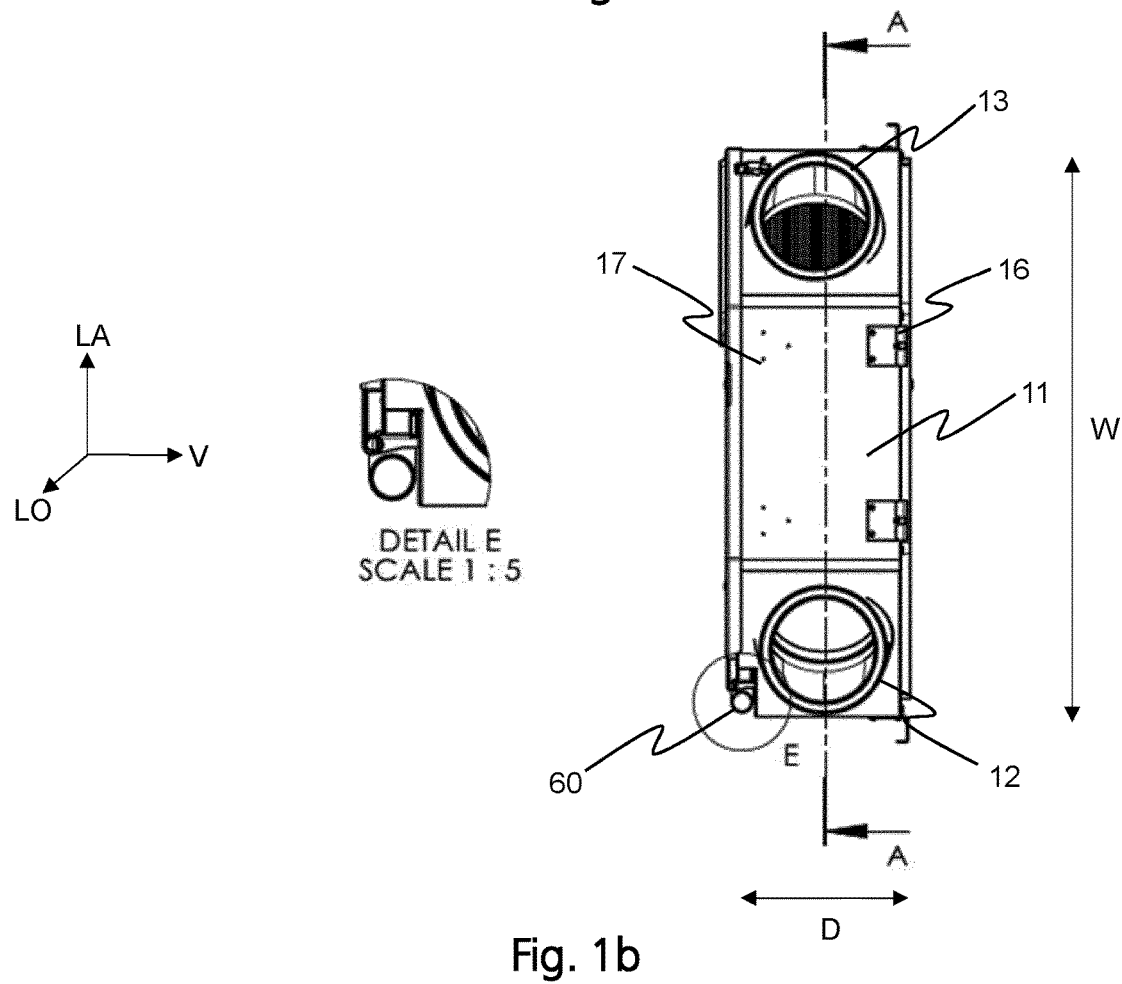

FIG. 1b shows a side view against longitudinal direction LO in FIG. 1a, as can be seen, the unit compartment has a depth D in vertical direction V. The unit housing 11 comprises different mounting structures 17 on different levels. As can be seen, mounting brackets 16 are mechanically coupled to the in the vertical direction upper level mounting structures, while lower levelled mounting structures 17 are not coupled to the mounting brackets. Different mounting structures on different levels allows for fast and flexible installation depending on the building requirements. Furthermore, drainage pipe 60 is shown, which allows for removing condensate from the heat recovery unit.

Figure 1C:
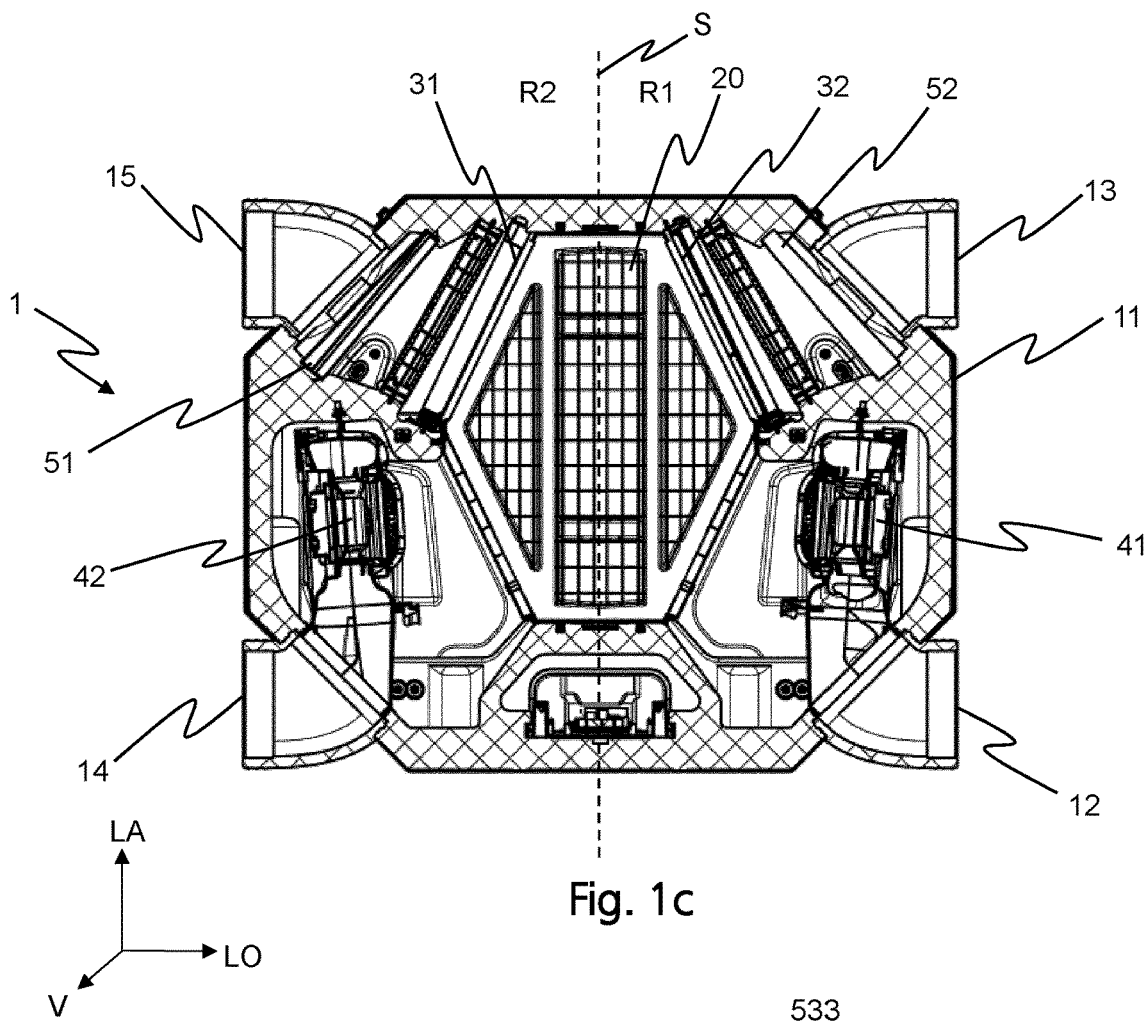
FIG. 1c shows a sectional view along A-A in FIG. 1b. of the heat recovery unit.

FIG. 1c shows a sectional view along A-A in FIG. 1b. Heat recovery unit 1 additionally comprises heat exchanger 20 being arranged within unit compartment 11 defined by the housing. Furthermore, the heat recovery unit comprises bypass valves 31 and 32, which are configured to control air flow through a fresh air bypass flow passage and through an exhaust air bypass flow passage. As can be seen, bypass valve 31 is within the fluid flow path arranged between outside are inlet 15 and heat exchanger 20. Bypass valve 32 is within the fluid flow path arranged between return air inlet 13 and heat exchanger 20. Heat recovery unit 1 also comprises two centrifugal fan arrangements, namely fresh air centrifugal fan arrangement 41 and exhaust air centrifugal fan arrangement 42. As can be seen, fresh air centrifugal fan arrangement 41 and exhaust air centrifugal fan arrangement 42 are arranged on opposite sides of the unit compartment and are symmetrically arranged with respect to each other. Fresh air centrifugal fan arrangement 41 is directly connected to supply air outlet 12 and exhaust air centrifugal fan arrangement 42 is directly connected to exhaust air outlet 14. Fresh air filter 51 is within the fluid flow path arranged between outside are inlet 15 and heat exchanger 20 and generally also between outside are inlet 15 and bypass valve 31. Exhaust air filter 52 is within the fluid flow path arranged between return air inlet 13 and heat exchanger 20, but generally also between return air inlet 13 and bypass valve 32. As can be further seen from FIG. 1c, heat recovery unit 1 comprises a setup being symmetric with respect to symmetry plane S, which divides the heat recovery unit in a first region R1 and a second region R2. In general, first region R1 and second region R2 are symmetrical with respect to symmetry plane S to each other. Such heat recovery unit have the advantage that they can readily be turned and directly used if for example the tubing installation within a building differs from the expected or planned installation, without having to reassemble the individual components of the heat recovery unit. First region R1 comprises the supply air outlet 12 and the return air inlet 13, fresh air centrifugal fan arrangement 41, bypass valve 32 and exhaust air filter 52. Concomitantly, second region R2 comprises exhaust air outlet 14, outside air inlet 15, exhaust air centrifugal fan arrangement 42, bypass valve 31 and fresh air filter 51. The heat exchanger 20 is symmetrically divided by symmetry plane S. As can be further seen individual components are symmetrical with respect to symmetry plane S to each other. For example, fresh air centrifugal fan arrangement 41 and exhaust air centrifugal fan arrangement 42 are symmetrically arranged with respect to symmetry plane to each other. Exhaust air filter 52 and the fresh air filter 51 are symmetrically arranged with respect to symmetry plane S to each other. Symmetry plane S lies within the lateral/vertical plane of the housing.

Figure 1D:
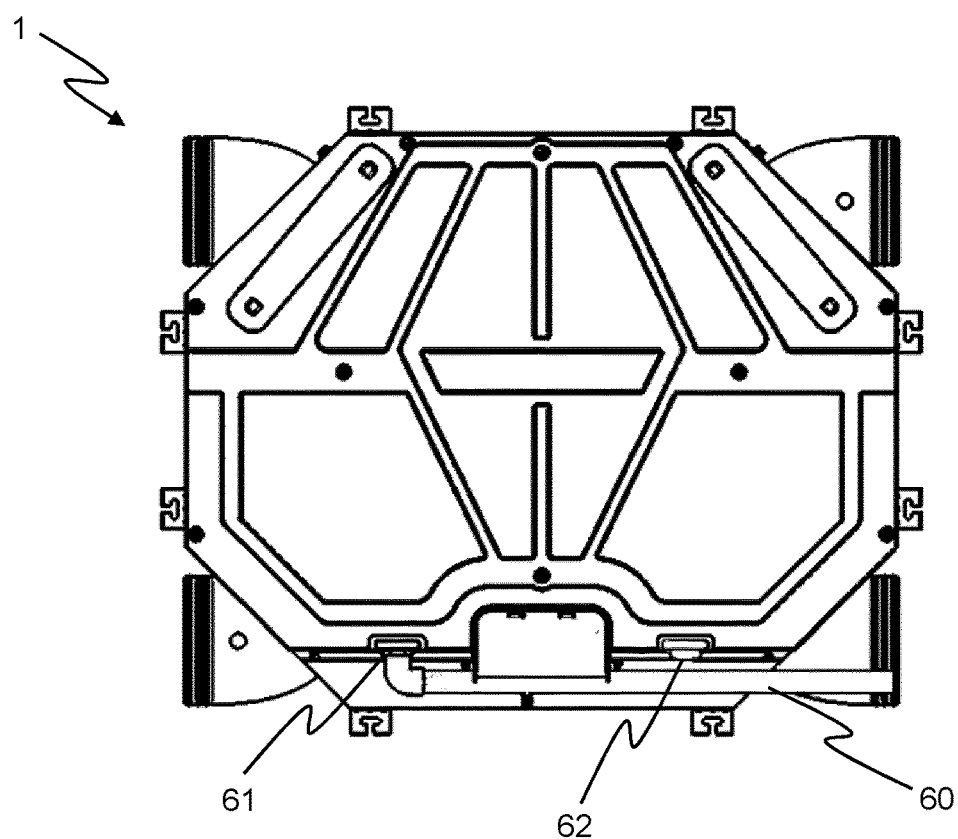
FIG. 1d shows an embodiment of the heat recovery according to the invention.

FIG. 1d shows another embodiment of the heat recovery unit of FIG. 1a. As can be seen, the heat recovery unit comprises a drainage with drainage pipe 60 and two symmetrically arranged drainage ports 61 and 62. In this embodiment only a single drainage port, i.e., drainage port 61, is fluidic connected to drainage pipe 60. The remaining other drainage port 62 is not fluidic connected to the drainage pipe.

Figure 1E:
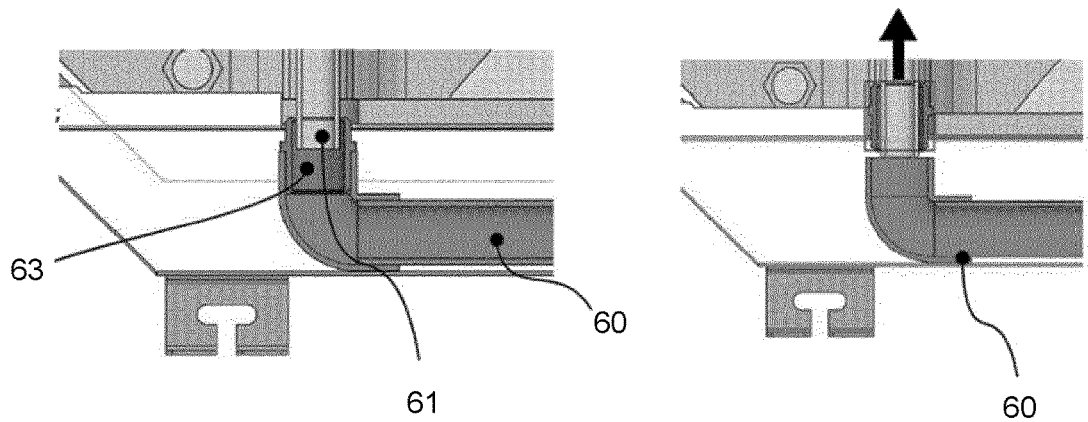
FIG. 1e shows an enlarged view of the embodiment shown in FIG. 1d.

FIG. 1e shows an enlarged view of drainage pipe 60 of FIG. 1d. Drainage pipe 60 is coupled to drainage port 61 by tubular connecting structure 63 being slidable along drainage port 61. In the connected state (left), the tubular connecting structure circumferentially extends around the drainage port and the drainage pipe circumferentially encloses the tubular connecting structure up to the outer circumferentially extending protuberance being configured as a stopper for drainage pipe 60. For disconnection, tubular connecting structure 63 is slid along drainage port 61 away from drainage tube 60 until the drainage tube is not anymore in direct mechanical contact with tubular connecting structure 63 and can be removed. Such a tubular connecting structure offers a releasable fast and secure connection of the drainage port and the drainage pipe without the need of additional adhesives.

Figure 1F:
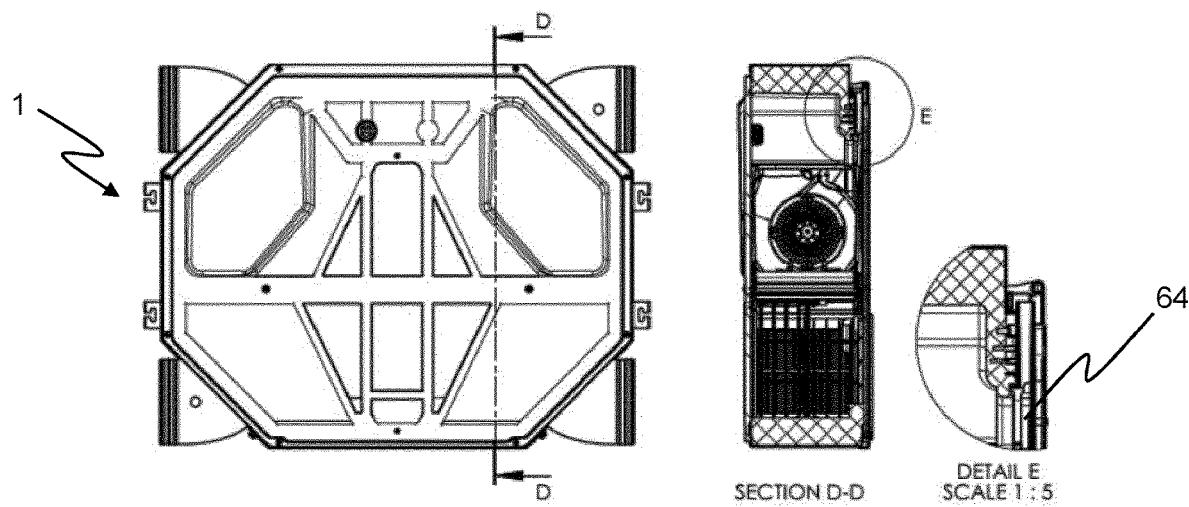

FIG. 1f shows a sectional view of the heat recovery unit of FIG. 1a along D-D with drip tray 64.

Figure 2:
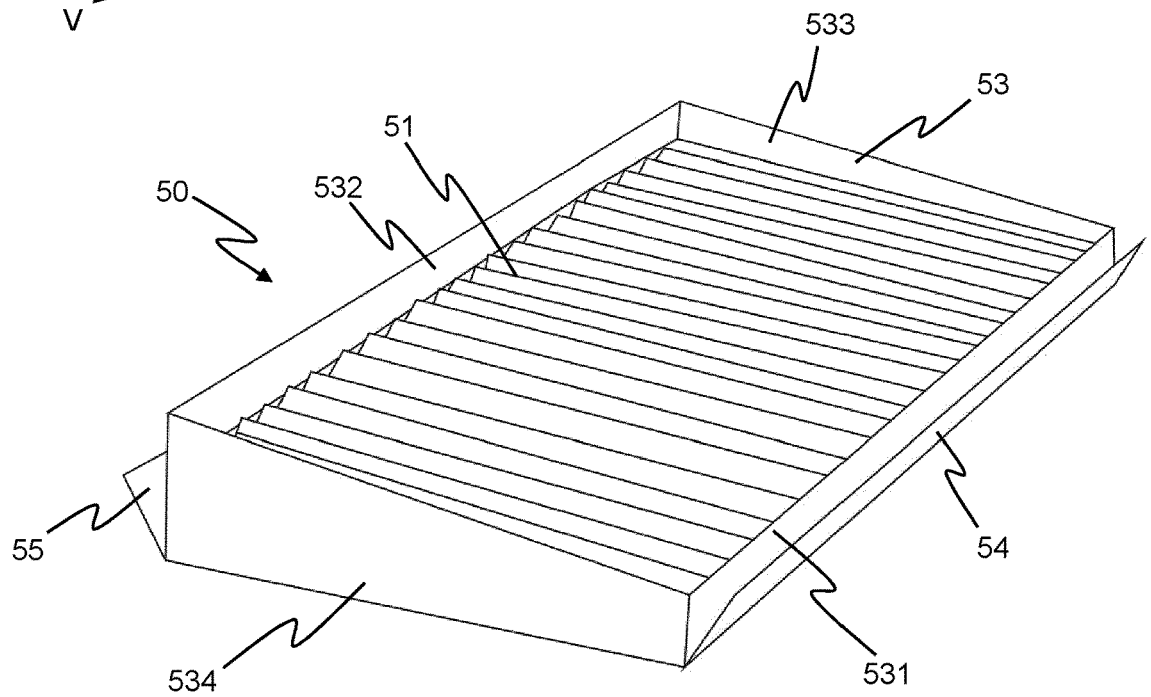
FIG. 2 shows a filter assembly with a filter as employed in another embodiment of the invention.

FIG. 2 shows a fresh air filter 51 which can be used in a heat recovery unit according to the invention. Filter 51 is comprised in filter assembly 50. Filter assembly 50 has a wedge shaped frame 53 to which filter 51 is attached to. Frame 53 comprises first frame portion 531 having a first height, second frame portion 532 having a second height which is greater than the first height, and being arranged opposite the first frame portion, a third frame portion 533 and a fourth frame portion 534 being arranged opposite the third frame portion, wherein the third frame portion and the fourth frame portion each extend between first frame portion 531 and second frame portion 532. As can be seen the height of first frame portion 531 and/or of second frame portion 532 can be constant. The height of third and fourth frame portions 533 and 534 can for example vary along third and/or fourth frame portion 533, 534 from the first frame portion to the second frame portion. Attached to first frame portion 531 is sealing flap 54. Attached second frame portion is sealing flap 55. Both sealing flaps provide for a tight seal.

Figure 3:
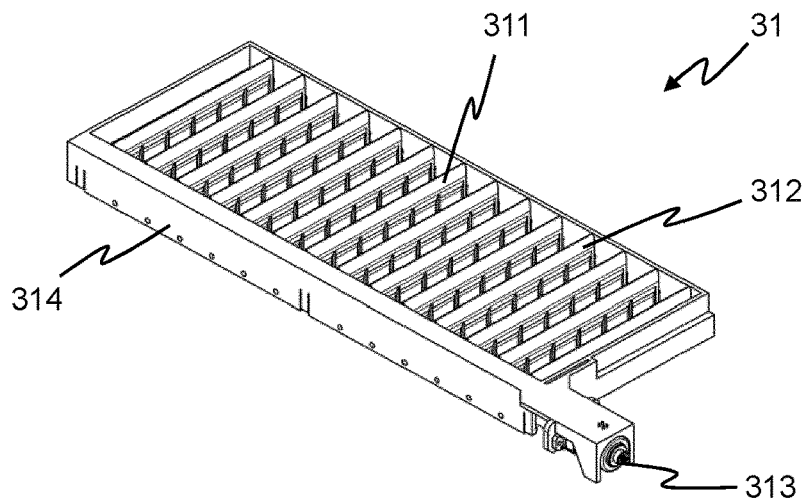
FIG. 3 shows a bypass valve in the open position as employed in another embodiment of the invention.
Figure 4:
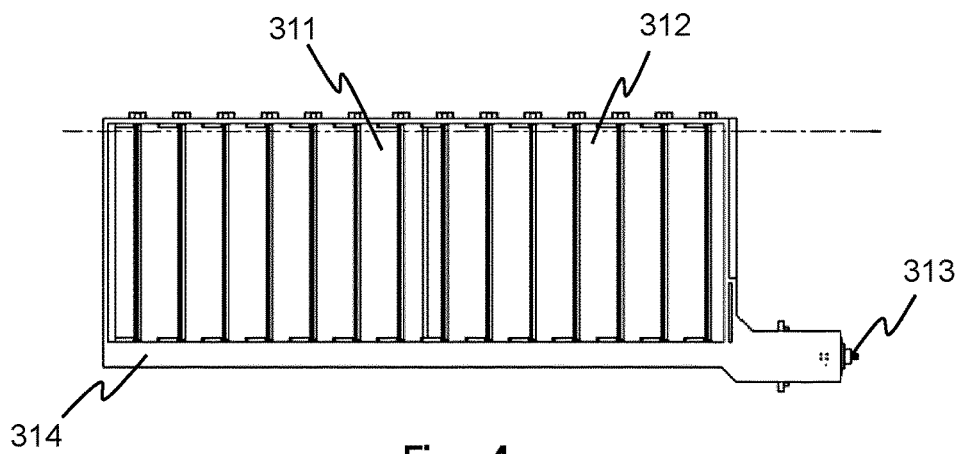
FIG. 4 shows the bypass valve of FIG. 3 in the closed position.

FIGS. 3 and 4 show bypass valve 31 which can be used in a heat recovery unit according to an embodiment of the invention. Bypass valve 31 comprises a plurality of elongated members 311, 312 (for reasons of clarity, only two elongated members are referenced), which are switchable between an open position (FIG. 3) and a closed position (FIG. 4). The elongated members are supported and connected to bypass valve frame 314. The bypass valve further comprises drive motor 313, which is configured to switch all or at least some of the elongated members between the closed position into the open position. Elongated members 311, 312 each are rotatable around their corresponding rotational axis.

Figure 5:
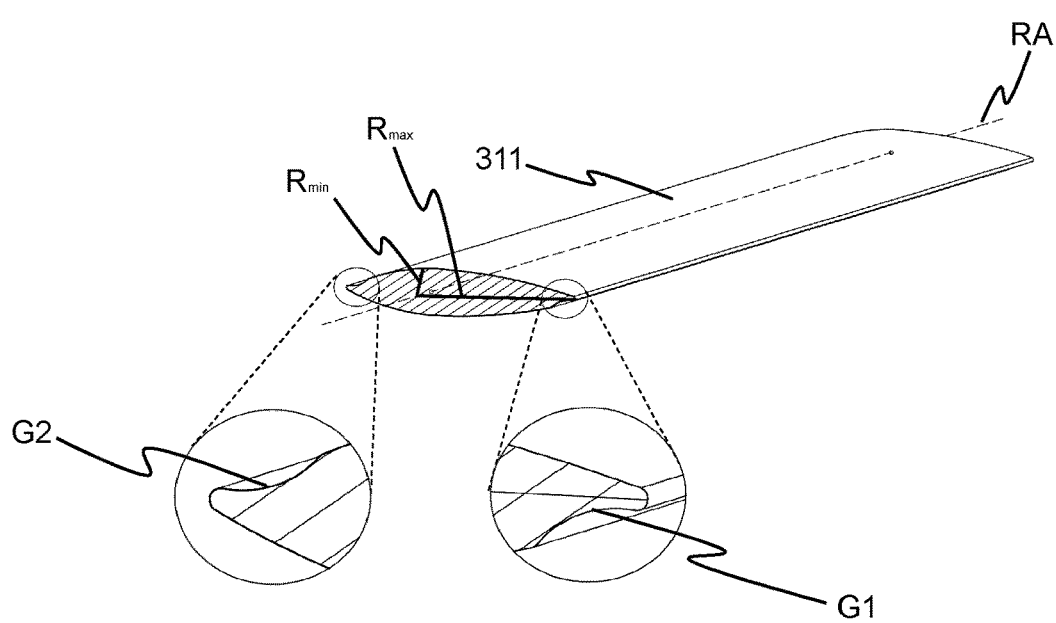
FIG. 5 shows an elongated member of a bypass valve as employed in another embodiment of the invention.

FIG. 5 shows an advantageous embodiment of elongated member 311, which can be used in a bypass valve according to any of the embodiments described herein. As can be seen, a radial dimension of elongated member 311 varies from its axis of rotation to its surface as a function of angular direction, i.e., the azimuth angle, within a plane orthogonal to said axis of rotation RA, thus defining angular directions with maximum radial dimension Rmax and angular directions with minimal radial dimensions Rmin. Furthermore, elongated member 311 comprises at its a radially outermost location first structural formation G1 and on its opposite radially outermost location a second structural formation G2 being complementary to the first structural configuration. As will be readily understood, first and second structural formations G1 and G2 are configured such that they engage with corresponding first and/or second structural formations of a directly adjacent elongated member, thereby forming a particularly air tight seal in the closed position.

Figure 6:
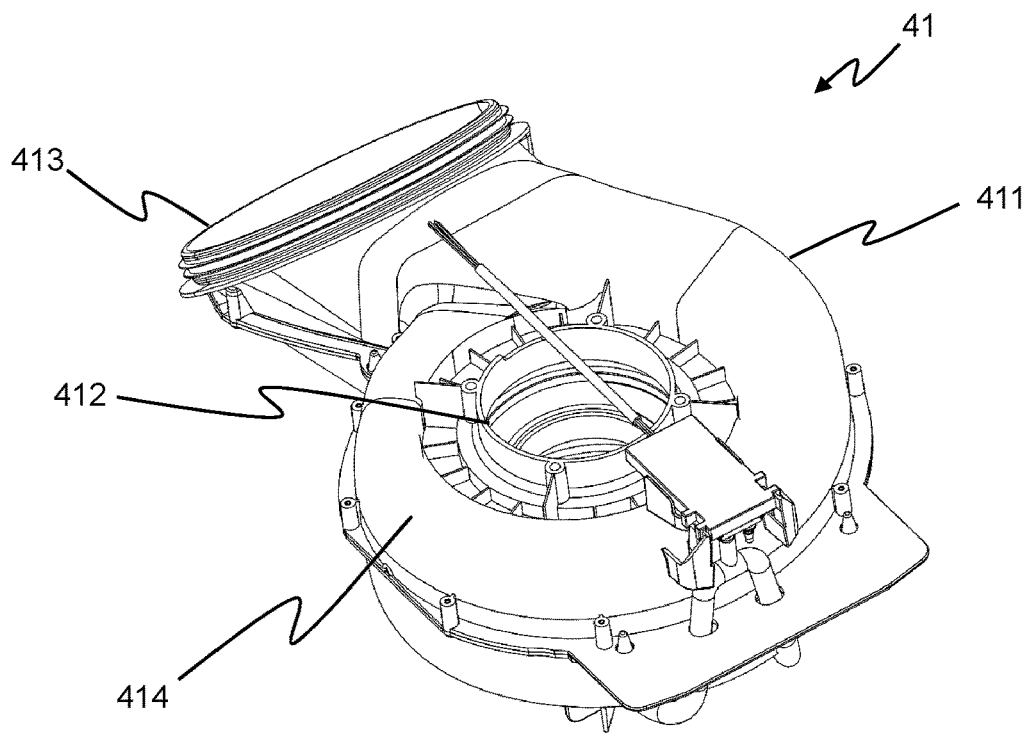
FIG. 6 shows a fresh air filter arrangement as employed in another embodiment of the invention.

FIG. 6 shows fresh air centrifugal fan arrangement 41 with scroll housing 411, however with the fan being removed. Scroll housing 411 comprises housing main portion 414 defining an air guiding space, housing inlet portion 412 defining an air inlet space and housing outlet portion 413 defining an air outlet space. The housing inlet portion is located at a radially inner location with respect to the air guiding space, respectively the housing main portion and the housing outlet portion is located at a radially outer location with respect to the air guiding space, respectively the housing main portion. Furthermore, in the direction of flow towards the air outlet space, the housing outlet portion defines an angled flow path with, in the embodiment shown, an angle of about 45°. This simplifies direct connection of scroll housing 411 to the supply air outlet, however, avoids any significant pressure drops.

Figure 7:
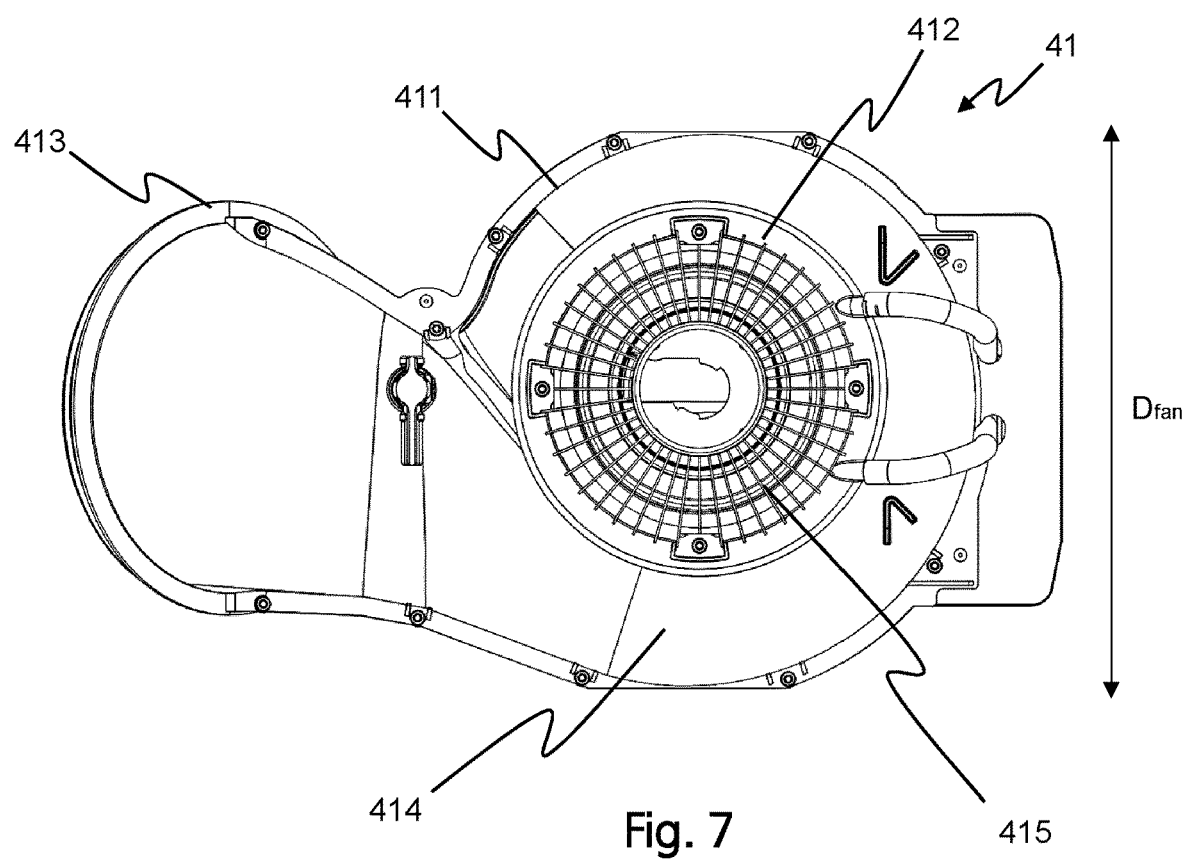
FIG. 7 shows a top view of a fresh air filter arrangement as employed in another embodiment of the invention.

FIG. 7 shows a top view of fresh air centrifugal fan arrangement 41 with centrifugal fan being mounted within scroll housing 411. Scroll housing 411 has maximum housing diameter Dfan, which describes the diameter at the main housing portion, however excluding the housing outlet portion 413.

Figure 8:
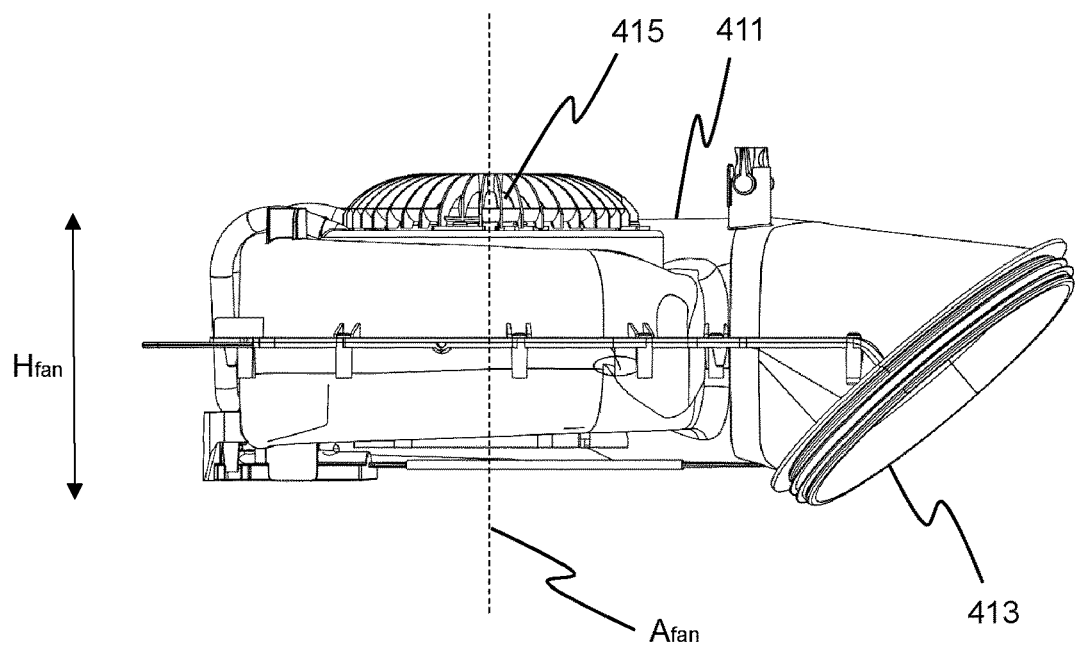
FIG. 8 shows a side view of the fresh air filter arrangement of FIG. 7.

FIG. 8 shows a side view of the fresh air centrifugal fan arrangement 41 of FIG. 7 with maximum axial housing width Hfan along rotational fan axis Afan. Furthermore, the 45° angle of the air flow path defined by the housing outlet portion towards the air outlet space can be seen.

The invention claimed is:

1. A heat recovery ventilation unit (1) comprising:
a unit housing (11) defining a unit compartment, wherein the unit housing (11) comprises a supply air outlet (12) for providing air flow from the unit compartment to an inside of a building, a return air inlet (13) for providing return air flow from the inside of the building to the unit compartment, an exhaust air outlet (14) for providing exhaust air flow from the unit compartment to an outside atmosphere of the building and an outside air inlet (15) for providing fresh air flow from the outside environment of the building to the unit compartment, wherein the heat recovery unit comprises the fresh air flow path from the outside air inlet (15) to the supply air outlet (12) and an exhaust air flow path from the return air inlet (13) to the exhaust air outlet (14);
a heat exchanger (20) being arranged within the unit compartment, the heat exchanger (20) comprising: fresh air flow passages for a fresh air flow being in fluidic communication with the supply air outlet (12) and the outside air inlet (15), and exhaust air flow passages for the exhaust air flow being in fluidic communication with the return air inlet (13) and the exhaust air outlet (14), wherein the fresh air flow passages and the exhaust air flow passages are configured such that thermal energy can be exchanged between the fresh air flow and the exhaust air flow;
a fresh air bypass flow passage being in fluidic communication with the supply air outlet (12) and with the outside air inlet (15), wherein the fresh air bypass flow passage bypasses the heat exchanger (20); and/or an exhaust air bypass flow passage being in fluidic communication with the return air inlet (13) and with the exhaust air outlet (14), wherein the exhaust air bypass flow passage bypasses the heat exchanger (20); wherein the fresh air bypass flow passage and/or the exhaust air bypass flow passage comprises a bypass valve (31, 32) arranged within the fresh air bypass flow passage and/or the exhaust air bypass flow passage, wherein the bypass valve (31, 32) is configured to control air flow through the fresh air bypass flow passage and/or the exhaust air bypass flow passage;
a fresh air centrifugal fan arrangement (41) configured for transporting fresh air from the outside air inlet (15) to the supply air outlet (12), and an exhaust air centrifugal fan arrangement (42) configured for transporting exhaust air from the return air inlet (13) to the exhaust air outlet (14), wherein the fresh air centrifugal fan arrangement (41) and the exhaust air centrifugal fan arrangement (42) each comprise a centrifugal fan (415) mounted within a scroll housing (411), wherein each scroll housing comprises a housing main portion, a housing inlet portion (412) defining an inner air inlet space and a housing outlet portion (413) defining an air outlet space, wherein the housing main portion surrounds the centrifugal fan to define a circumferentially extending air guiding space (414), and wherein the housing inlet portion is located at a radially inner location with respect to the air guiding space (414) to define an inner air inlet space, and wherein the housing outlet portion (413) is located at a radially outer location with respect to the air guiding space (414) to define an air outlet space wherein the housing outlet portion defines an angled air flow path from the air guiding space towards the air outlet space; and
a fresh air filter (51) being arranged within the fresh air flow path and an exhaust air filter (52) being arranged within the exhaust air flow path.

2. The heat recovery ventilation unit (1) according to claim 1, wherein the bypass valve (51, 52) comprises a plurality of elongated members extending across the fresh air bypass flow passage and/or the exhaust air bypass flow passage and being arranged in parallel adjacent to each other, thereby forming in a closed position a barrier configured to provide maximum flow resistance to air flowing through the fresh air bypass flow passage and/or the exhaust air bypass flow passage, wherein at least some of the elongated members are switchable into an open position in which the elongated members provide a minimum flow resistance to the air flowing through the fresh air bypass flow passage and/or the exhaust air bypass flow passage.

3. The heat recovery ventilation unit (1) according to claim 2 further comprising a drive motor configured to switch the elongated members between the open position and the closed position.

4. The heat recovery ventilation unit (1) according to claim 1, wherein the fresh air filter (51) is arranged between the heat exchanger (20) and the outside air inlet (15) and wherein the exhaust air filter (52) is arranged between the heat exchanger (20) and the exhaust air outlet (13).

5. The heat recovery ventilation unit (1) according to claim 1, wherein the fresh air filter (51) and the exhaust air filter (52) each are arranged within a filter assembly (50) comprising a wedge shaped frame (53).

6. The heat recovery ventilation unit (1) according to claim 5, wherein the filter assembly (50) is received by a slot within the unit housing (11) and wherein the filter assembly (50) is releasably mounted to the unit housing (11).

7. The heat recovery unit according (1) to claim 1, wherein each centrifugal fan comprises a plurality of circumferentially spaced fan blades fixed to a central fan axle extending along an axial direction and/or to a circumferential fan ring extending in a plane orthogonal to an axial direction.

8. The heat recovery unit (1) according to claim 1, wherein the ratio D/H between the maximum housing diameter Dfan and the maximum axial housing width Hfan is between 25:10 and 32:10.

9. The heat recovery unit (1) according to claim 1, wherein the housing outlet portion defines an angled air flow path from the air guiding space towards the air outlet space, wherein preferably the air flow path is angled by an angle of 40° to 50°.

10. The heat recovery unit (1) according to claim 1, wherein the housing outlet portion at least partially defines an air flow path from the air guiding space towards the air outlet space being transverse to the air flow exiting the heat exchanger and/or to the air flow entering the inner air inlet space of the scroll housing.

11. The heat recovery unit (1) according to claim 1, wherein each scroll housing is arranged such that air flow exiting the heat exchanger (20) enters each scroll housing without being guided along an angled flow path.

12. The heat recovery unit (1) according to claim 1, further comprising a drainage for collecting and removing condensate.

13. The heat recovery unit (1) according to claim 12, wherein the drainage comprises a drip tray (64), at least one drainage port (61, 62) and a drainage pipe (60) being in fluidic communication with the at least one drainage port (61, 62).

14. The heat recovery unit (1) according to claim 1, wherein the heat recovery unit comprises a setup being symmetric with respect to a symmetry plane (S), wherein the symmetry plane symmetrically divides the heat recovery unit in a first region and a second region, and wherein the supply air outlet and the return air inlet are arranged in the first region and the exhaust air outlet and the outside air inlet are arranged in the second region.

15. The heat recovery unit (1) according to claim 14, wherein the symmetry plane extends through the heat exchanger, wherein the heat exchanger is symmetrical with respect to the symmetry plane.

16. A heat recovery ventilation unit (1) comprising:
a unit housing (11) defining a unit compartment, wherein the unit housing (11) comprises a supply air outlet (12) for providing air flow from the unit compartment to the inside of a building, a return air inlet (13) for providing return air flow from the inside of a building to the unit compartment, an exhaust air outlet (14) for providing exhaust air flow from the unit compartment to the outside atmosphere of a building and an outside air inlet (15) for providing air flow from the outside environment of a building to the unit compartment, wherein the heat recovery unit comprises a fresh air flow path from the outside air inlet (15) to the supply air outlet (12) and an exhaust air flow path from the return air inlet (13) to the exhaust air outlet (14);
a heat exchanger (20) being arranged within the unit compartment, the heat exchanger (20) comprising: fresh air flow passages for a fresh air flow being in fluid communication with the supply air outlet (12) and the outside air inlet (15), and exhaust air flow passages for an exhaust air flow being in fluidic communication with the return air inlet (13) and the exhaust air outlet (14), wherein the fresh air flow passages and the exhaust air flow passages are configured such that thermal energy can be exchanged between the fresh air flow and the exhaust air flow;
a fresh air bypass flow passage being in fluidic communication with the supply air outlet (12) and with the outside air inlet (15), wherein the fresh air bypass flow passage bypasses the heat exchanger (20); and/or an exhaust air bypass flow passage being in fluidic communication with the return air inlet (13) and with the exhaust air outlet (14), wherein the exhaust air bypass flow passage bypasses the heat exchanger (20); wherein the fresh air bypass flow passage and/or the exhaust air bypass flow passage comprises a bypass valve (31, 32) arranged within the fresh air bypass flow passage and/or the exhaust air bypass flow passage, wherein the bypass valve (31, 32) is configured to control air flow through the fresh air bypass flow passage and/or the exhaust air bypass flow passage;
a fresh air centrifugal fan arrangement (41) configured for transporting fresh air from the outside air inlet (15) to the supply air outlet (12), and an exhaust air centrifugal fan arrangement (42) configured for transporting exhaust air from the return air inlet (13) to the exhaust air outlet (14), wherein the fresh air centrifugal fan arrangement (41) and the exhaust air centrifugal fan arrangement (42) each comprise a centrifugal fan (415) mounted within a scroll housing (411), wherein each scroll housing comprises a housing main portion, a housing inlet portion (412) defining an inner air inlet space and a housing outlet portion (413) defining an air outlet space, wherein the housing main portion surrounds the centrifugal fan to define a circumferentially extending air guiding space (414), and wherein the housing inlet portion is located at a radially inner location with respect to the air guiding space (414) to define an inner air inlet space, and wherein the housing outlet portion (413) is located at a radially outer location with respect to the air guiding space (414) to define an air outlet space wherein the housing outlet portion defines an angled air flow path from the air guiding space towards the air outlet space, wherein the air flow path is angled by an angle of 30° to 60°; and
a fresh air filter (51) being arranged within the fresh air flow path and an exhaust air filter (52) being arranged within the exhaust air flow path.

17. A heat recovery ventilation unit (1) comprising:
a unit housing (11) defining a unit compartment, wherein the unit housing (11) comprises a supply air outlet (12) for providing air flow from the unit compartment to the inside of a building, a return air inlet (13) for providing return air flow from the inside of a building to the unit compartment, an exhaust air outlet (14) for providing exhaust air flow from the unit compartment to the outside atmosphere of a building and an outside air inlet (15) for providing air flow from the outside environment of a building to the unit compartment, wherein the heat recovery unit comprises a fresh air flow path from the outside air inlet (15) to the supply air outlet (12) and an exhaust air flow path from the return air inlet (13) to the exhaust air outlet (14);
a heat exchanger (20) being arranged within the unit compartment, the heat exchanger (20) comprising: fresh air flow passages for a fresh air flow being in fluid communication with the supply air outlet (12) and the outside air inlet (15), and exhaust air flow passages for an exhaust air flow being in fluidic communication with the return air inlet (13) and the exhaust air outlet (14), wherein the fresh air flow passages and the exhaust air flow passages are configured such that thermal energy can be exchanged between the fresh air flow and the exhaust air flow;
a fresh air bypass flow passage being in fluidic communication with the supply air outlet (12) and with the outside air inlet (15), wherein the fresh air bypass flow passage bypasses the heat exchanger (20); and/or an exhaust air bypass flow passage being in fluidic communication with the return air inlet (13) and with the exhaust air outlet (14), wherein the exhaust air bypass flow passage bypasses the heat exchanger (20); wherein the fresh air bypass flow passage and/or the exhaust air bypass flow passage comprises a bypass valve (31, 32)

arranged within the fresh air bypass flow passage and/or the exhaust air bypass flow passage, wherein the bypass valve (31, 32) is configured to control air flow through the fresh air bypass flow passage and/or the exhaust air bypass flow passage;

a fresh air centrifugal fan arrangement (41) configured for transporting fresh air from the outside air inlet (15) to the supply air outlet (12), and an exhaust air centrifugal fan arrangement (42) configured for transporting exhaust air from the return air inlet (13) to the exhaust air outlet (14), wherein the fresh air centrifugal fan arrangement (41) and the exhaust air centrifugal fan arrangement (42) each comprise a centrifugal fan (415) mounted within a scroll housing (411), wherein each scroll housing comprises a housing main portion with a maximum housing diameter Dfan and a maximum axial housing width Hfan, wherein the ratio D/H between the maximum housing diameter Dfan and the maximum axial housing width Hfan is between 20:10 and 35:10; and a fresh air filter (51) being arranged within the fresh air flow path and an exhaust air filter (52) being arranged within the exhaust air flow path.

* * * * *